(12) United States Patent
Brizendine et al.

(10) Patent No.: US 6,484,147 B1
(45) Date of Patent: Nov. 19, 2002

(54) DATA PROCESSING SYSTEM FOR FACILITATING MERCHANDISE TRANSACTIONS

(75) Inventors: Kyle Brizendine, Mexia, TX (US); Gary Carini, Lorena, TX (US); Bob deBeer, Dallas, TX (US); Kevin S. Dunn, Cedar Hill, TX (US); Bruce Peltz, Dallas, TX (US); Deborah Peltz, Dallas, TX (US); William E. Stone, III, Dallas, TX (US); Jim A. Yockey, Dallas, TX (US)

(73) Assignee: EdExpress, Inc., Plano, TX (US)

( * ) Notice: Subject to any disclaimer, the term of this patent is extended or adjusted under 35 U.S.C. 154(b) by 0 days.

(21) Appl. No.: 09/418,627

(22) Filed: Oct. 15, 1999

Related U.S. Application Data

(60) Provisional application No. 60/117,500, filed on Jan. 27, 1999.

(51) Int. Cl.[7] .............................................. G06F 17/60
(52) U.S. Cl. ....................................................... 705/14
(58) Field of Search ............................... 705/1, 10, 14; 235/380, 383; 379/114.12, 114.15

(56) References Cited

U.S. PATENT DOCUMENTS

| | | | | |
|---|---|---|---|---|
| 3,852,571 | A | * 12/1974 | Hall et al. ............... | 235/380 X |
| 5,574,269 | A | 11/1996 | Mori et al. ............... | 235/380 |
| 5,774,870 | A | 6/1998 | Storey ...................... | 705/14 |
| 6,009,412 | A | 12/1999 | Storey ...................... | 705/14 |
| 6,012,049 | A | * 1/2000 | Kawan ..................... | 705/41 |
| 6,032,123 | A | * 2/2000 | Jameson ................... | 705/8 |
| 6,105,865 | A | * 8/2000 | Hardesty .................. | 235/380 |

FOREIGN PATENT DOCUMENTS

| | | | |
|---|---|---|---|
| EP | 308 224 A | 3/1989 | |
| WO | 98/25242 | 6/1998 | |
| WO | 98/28699 | 7/1998 | |
| WO | 98/38562 | 9/1998 | |
| WO | WO 99 27483 | 6/1999 | |
| WO | WO 00/45315 | * 8/2000 | ............... 705/14 X |

OTHER PUBLICATIONS

How to Profit from Merchandise Incentives; Incentive, v165n9, pp 4–34, Sep. 1991.*
Merchandisers Hit College Campuses; Boston Globe, Aug. 23, 1998.*
www.Teen.com, Copyright 1999, Teen.com, Feb. 14, 2000.
www.Bolt.com, Bolt Inc., Feb. 14, 2000.
www.Alloy.com, Alloy Online, Inc., Feb. 14, 2000.
www.CollegeClub.com, Copyright 1996–2000, CollegeClub.com, Feb. 14, 2000.

(List continued on next page.)

Primary Examiner—Stephen Gravini
(74) Attorney, Agent, or Firm—Scheef & Stone, L.L.P.; Jack D. Stone, Jr.

(57) ABSTRACT

A data processing system for facilitating merchant transactions includes a computer for processing data, and a storage device for storing data processed by the computer. Data regarding the purchase by a purchaser of merchandise from a merchant for a specified amount of money is entered into the computer. Monetary points are then calculated which are proportionate to a purchase made. The monetary points are then allocated between a first account which may be used by a first person for the purchase of additional merchandise from the merchant, and a second account which may be used by a second person for education at an educational institution. The monetary points allocated to the first account and the second are recorded in the storage device.

27 Claims, 15 Drawing Sheets

OTHER PUBLICATIONS www.StudentAdvantage.com, Copyright 1999–2000, StudentAdvantage.com, Inc., Feb. 14, 2000.
www.mybytes.com, Copyright 1999–2000, YouthStream Media Networks, Inc., Feb. 14, 2000.
www.OnTap.com, Copyright 1995–2000, OnTap.com, Feb. 14, 2000.
www.RocketCash.com, Rocket Cash Corporation, Feb. 14, 2000.
www.doughNET.com, Copyright 2000, DoughNET, Inc., Feb. 14, 2000.
www.myAllowance.com, Feb. 14, 2000.
www.iCanBuy.com, copyright 1999–2000, iCanBuy.com, Inc., Feb. 14, 2000.
www.FreeRide.com, Copyright 1995–2000, FreeRide.com, LLC, Feb. 14, 2000.
www.HEYnetwork.com, Copyright 1999, HEYnetwork.com, Inc., Feb. 14, 2000.
www.collegestudent.com, Copyright 1996–1999, Collegestudent.com, Inc., Feb. 22, 2000.
Ostdick, John H., *Spending e–allowances at e–stores*, Dallas Morning News, pp. 1F and 6F, Aug. 3, 1999.
www.beenz.com (3 pages) 7/00.
www.charitymall.com (3 pages) 7/00.
www.child.net/shop.htm (3 pages) 7/00.
www.clickrewards.com (2 pages) 7/00.
www.collegiateplus.com (1 page) 4/00.
www.dELiAs.cOm (1 page) 7/00.
www.4myCommunity.com (6 pages) 4/00.
www.gotschoolfundraising.com (4 pages) 7/00.
www.greatergood.com (2 pages) 7/00.
www.iGive.com (3 pages) 7/00.
www.kidscollegefund.com (3 pages) 7/00
www.kidsfuture.com (2 pages) 4/00.
www.kidsownamerica.com (3 pages) 7/00.
penny.rwc.cybercash.com/kidpics (1 page) 7/00.
www.savedaily.com (24 pages) 7/00.
www.schoolcash.com (5 pages) 7/00.
www.schoolpop.com (3 pages) 7/00.
www.shopandearn.com (3 pages) 7/00.
www.shopforchange.com (2 pages) 7/00.
www.studentcenter.org (3 pages) 7/00.
www.technology4kids.com/index.cfm (3 pages) 7/00.
www.teens–online.com (2 pages) 7/00.
www.teenshopping.org (2 pages) 7/00.
www.yourschoolshop.com (7 pages) 7/00.

\* cited by examiner

DATA PROCESSING SYSTEM FOR FACILITATING MERCHANDISE TRANSACTIONS

CLAIM OF PRIORITY

This application claims priority from U.S. Provisional Patent Application No. 60/117,500 to Kyle Richmond Brizendine, entitled "DATA PROCESSING SYSTEM FOR TRACKING RETAIL TRANSACTIONS" filed Jan. 27, 1999

TECHNICAL FIELD

The invention relates generally to a data processing system and, more particularly, to a data processing system configured for facilitating purchases of merchandise.

BACKGROUND

The present economy is being driven by many dynamics. Among them, consumer sales of retail products and services are increasingly being transacted electronically, e.g., through e-commerce, rather than through traditional "brick-and-mortar" retail stores. But because many billions of dollars have been invested in "brick-and-mortar" retail stores, there is great interest in sustaining sales at such retail stores. Attempts by retail stores to stem the tide of sales to e-commerce have been ineffective thus far.

Another dynamic driving the present economy is a trend toward a substantial percentage of consumers conducting retail transactions with credit cards. However, persons under the age of eighteen (minors) are not generally permitted to engage in credit card transactions. As a result, minors are disadvantaged in the marketplace for consumer goods and services.

In yet another dynamic driving the economy, the workforce is becoming more highly educated, and as the work environment is becoming more "hi-tech" and information-oriented, education is becoming increasingly valued and necessary for employees to compete for and obtain jobs. As education is becoming more valued, the price for higher education is also increasing, at a much faster rate than the inflation rate. This concerns many parents who struggle to make ends meet, and also desire to set funds aside to provide the best education possible for their children.

Therefore, what is needed is a system and method which restores and sustains consumer sales of retail goods and services at traditional "brick-and-mortar" retail stores, enables minors to overcome the disadvantages of not being permitted to use credit cards, and which would also enable adults to set aside funds for the education of themselves, their children, and/or other family members or friends.

SUMMARY

The present invention, accordingly, provides a system and method which utilizes a data processing system for facilitating merchant transactions. The system includes a computer for processing data, and a storage device for storing data processed by the computer. Data regarding the purchase by a purchaser of merchandise from a merchant for a specified amount of money is entered into the computer. Monetary points are then calculated which are proportionate to a purchase made. The monetary points are then allocated between a first account which may be used by a first person for the purchase of additional merchandise from the merchant, and a second account which may be used by a second person for education at an educational institution. The monetary points allocated to the first account and the second are recorded in the storage device.

By the use of the present invention, "brick-and-mortar" retail stores may take advantage of the benefits of the Internet to better compete with e-commerce conducted over the Internet. Furthermore, minors may obtain many of the advantages of credits cards with club cards. Parents of minors also attain some peace of mind knowing that the club will provide funds for the minors to attend an educational institution such as college or a university.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION

In the following discussion, numerous specific details are set forth to provide a thorough understanding of the present invention. However, it will be obvious to those skilled in the art that the present invention may be practiced without such specific details. In other instances, well-known elements have been summarily illustrated in block or schematic diagram form in order not to obscure the present invention in unnecessary detail. Additionally, for the most part, details concerning computers and networks and the interconnection and operation thereof, including interrupt requests (IRQs), and the like, have been omitted inasmuch as such details are not considered necessary to obtain a complete understanding of the present invention and are within the skills of persons of ordinary skill in the relevant art.

Figure 1:
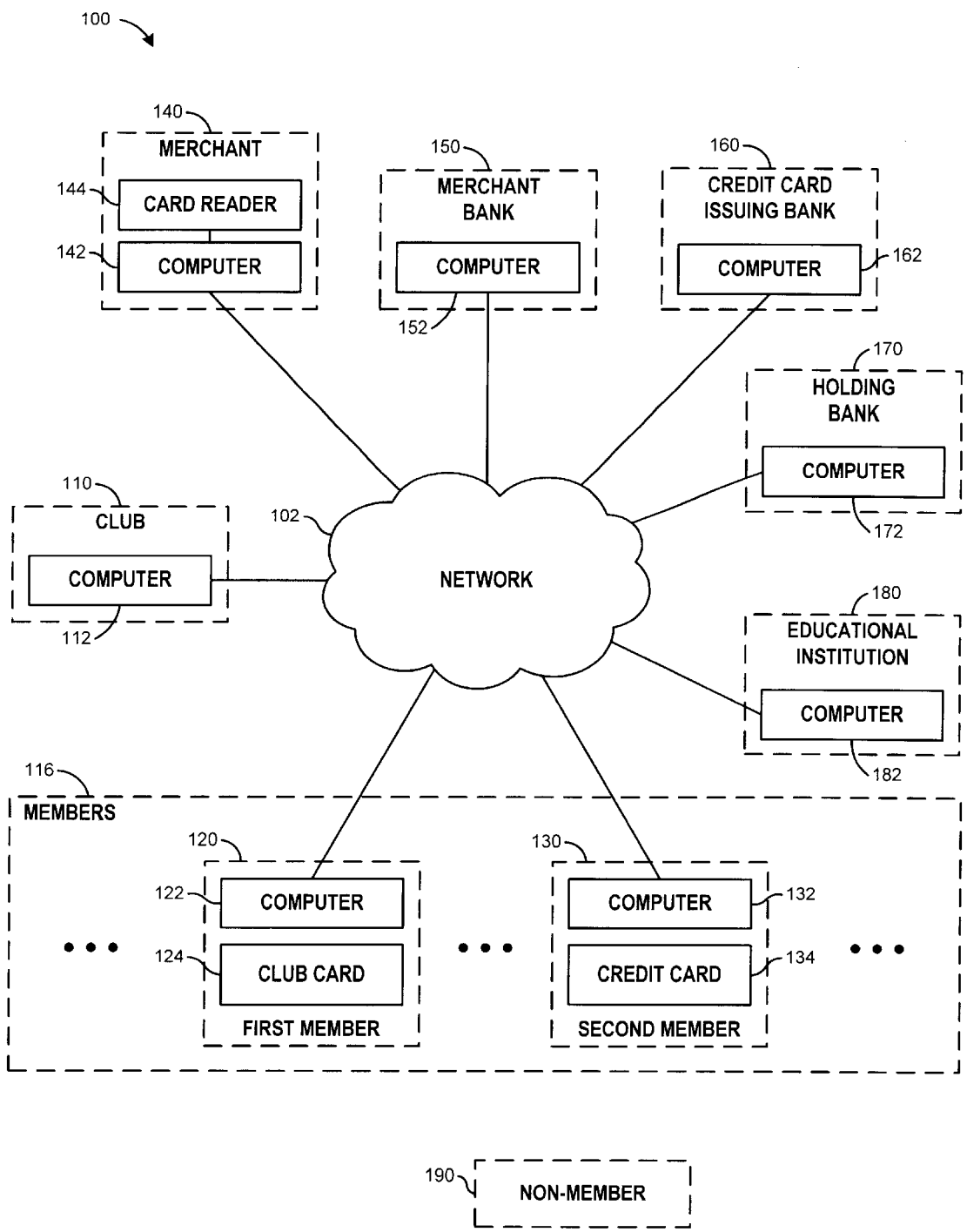
FIG. 1 is a schematic diagram showing a network embodying features of the present invention.

Referring to FIG. 1 of the drawings, the reference numeral 100 generally designates a system embodying features of the present invention. The system 100 includes a network 102, such as a local area network (LAN), a metropolitan area network (MAN), a wide area network (WAN), a public switched telephone network (PSTN), a world-wide network of computers (the Internet), or the like, either singularly or in any combination thereof, well-known in the art, configured for facilitating conventional communications of data, voice, multimedia, and/or the like, between an organization referred to herein as a "club" 110, via at least one club computer 112, and a plurality of members 116, as well as a number of selected entities. The at least one club computer 112 preferably comprises a plurality of interconnected computers 112 having terminals (not shown) widely distributed throughout a number of locations such as, for example, participating retail stores, banks, and kiosks located in shopping malls. As described in further detail below, the plurality of members 116 preferably includes at least one first member 120 and at least one second member 130, and the selected entities preferably include at least one of each of a merchant 140, a merchant bank 150, a credit card issuing (CCI) bank 160, a holding bank 170, and an educational institution 180, interconnected to and through the network 102 for data communication therebetween. A non-member 190 is shown in FIG. 1, which non-member is not recognized by the club 110 as being a member thereof. While only one or two of each of the aforementioned entities is shown in FIG. 1, a preferred embodiment of the present invention would comprise a plurality of each of such entities, each of which entities would operate and interact substantially as described herein.

A member 116, such as the first member 120 and second member 130, of the club 112 may be a minor or an adult, and members 116 may furthermore be related to, and/or be friends of, one another. As generally used herein, the term "minor" is defined with reference to a person's age, wherein such age is less than the minimum age required under law for such person to use a credit card to purchase merchandise, such age in most jurisdictions being eighteen years of age. Thus, a minor is generally considered herein to be a person under eighteen years of age, it being understood that such age may vary. The term "adult" is generally defined herein in contrast to a minor, i.e., as a person of such age as to be able under the law to use a credit card to purchase merchandise. Thus, in accordance with the foregoing, an adult may generally be considered herein to be a person of at least eighteen years of age, it being understood that such age may vary.

Each member 116 of the plurality of members of the club 112 preferably has access to at least one computer. As exemplified in FIG. 1, each member 120 and 130 has access to a computer 122 and 132, respectively, though two or more members may optionally access a common computer. Such computers are connected to the network 102 for providing an interface between the respective members 116, and the selected entities, including the club 110 via the club computer 112, connected to the network 102.

Each member 116 of the plurality of members of the club 112 is preferably also provided with a club card and/or a credit card (e.g., Visa, MasterCard, and the like) identified with the club 110. As exemplified in FIG. 1, the member 120 is provided with a club card 124, and the member 130 is provided with a credit card 134. The club card 124 provides identification of the respective member 120 to the club 110, and to entities which have joined the club 110, and may be used to generate, as well as redeem, monetary points, described further below. The club card is described in further detail with respect to FIG. 4.

The credit card 134 may be either a credit card issued by the credit card issuing (CCI) bank member 160, or a pre-existing credit card in which the account number on the card is identified, using conventional technology, as being that of the club member 130. The credit card 134 may preferably be used to generate monetary points, but not to redeem monetary points, described further below.

The merchant 140 may be a retailer, manufacturer, provider, or the like, of merchandise. The term "merchandise" is generally used herein to include consumer goods and services and the like, although it is not necessarily limited to consumer goods and services. The merchant 140 has at least one merchant computer 142 connected to the network 102 for providing an interface between the merchant 140 and selected entities, including the club 110 via the computer 112, connected to the network 102. The merchant 140 has a conventional card reader 144, such as a magnetic code reader, bar code scanner, or the like, effective for reading data imprinted on the cards 124 and 134, presented to the merchant 140 during a merchandise transaction. The card reader 144 is connected to the computer 142 for transferring data read from the cards 124 and 134 to the computer 142, as described further below.

The merchant bank 150 is a bank employed by the merchant 140 for maintaining the merchant's accounts. The merchant bank 150 includes at least one merchant bank computer 152 connected to the network 102 for providing an interface between the merchant bank 150 and selected entities, including the club 110 via the computer 112, connected to the network 102.

The credit card issuing (CCI) bank 160 is a bank selected by a member 116 for providing the member with a conventional credit card and associated services, such as tracking transactions made with the credit card, and maintaining the respective member's credit card account. The CCI bank 160 includes at least one CCI bank computer 162 connected to the network 102 for providing an interface between the CCI bank 160 and selected entities, including the club 110 via the computer 112, connected to the network 102. The CCI bank 160 is also operable as a processing agency, as described further below.

The holding bank 170 is a bank employed by the club 110 for maintaining education accounts (or, alternatively, trust accounts). The holding bank 170 includes at least one holding bank computer 172 connected to the network 102 for providing an interface between the holding bank 170 and selected entities, including the club 110 via the computer 112, connected to the network 102.

The educational institution 180 may be any of a number of educational fund recipients qualified by the club 110 for providing educational services, such as a college, university, trade school, seminary, or the like. The educational institution 180 includes at least one educational institution computer 182 connected to the network 102 for providing an interface between the educational institution 180 and selected entities, such as the club 110 via the club computer 112, connected to the network 102.

Figure 2:
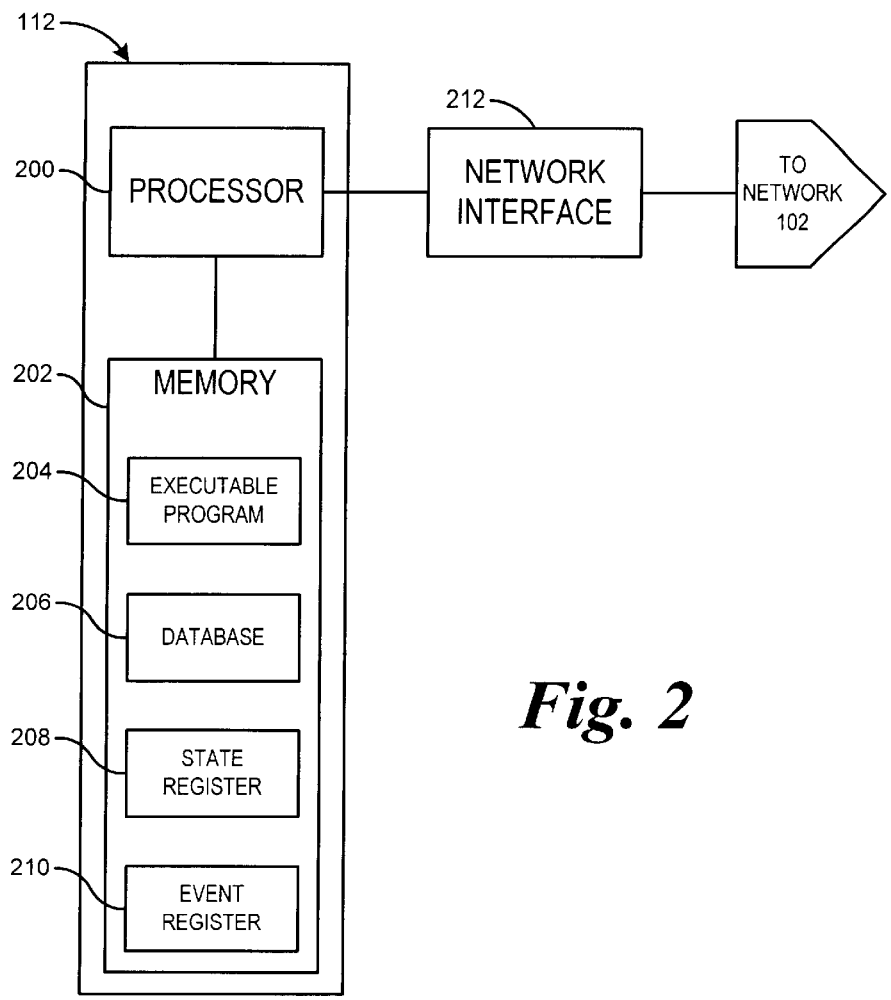
FIG. 2 is a schematic diagram which exemplifies a club computer which may be used in the network of FIG. 1.

FIG. 2 is a schematic diagram depicting aspects of the club computer 112. As shown therein, the computer 112 includes at least one conventional processor 200 (also referred to as a central processing unit (CPU) or arithmetic logic unit) adapted for processing data received from the network 102, for storing such data in records of a database (discussed below with respect to FIG. 3), executing processes comprising application programs effective for managing database operations and computers on the network 102, and the like. A memory 202, such as random access memory (RAM) and/or a hard disk memory, is operably connected to the processor 200. As discussed in further detail below, the memory 202 is apportioned between at least an executable program 204, a database 206, a state register 208, and an event register 210. A conventional interface 212 is connected to the processor 200 for providing an interface between the processor 200 and the network 102. The computer 112 may constitute a network server computer, and may be used to maintain a web page (not shown) through the network 102, in a manner well-known in the art. The web page provides selected information, described below, which may be accessed by any entity connected to the network 102 in a manner well-known in the art.

Figure 3:
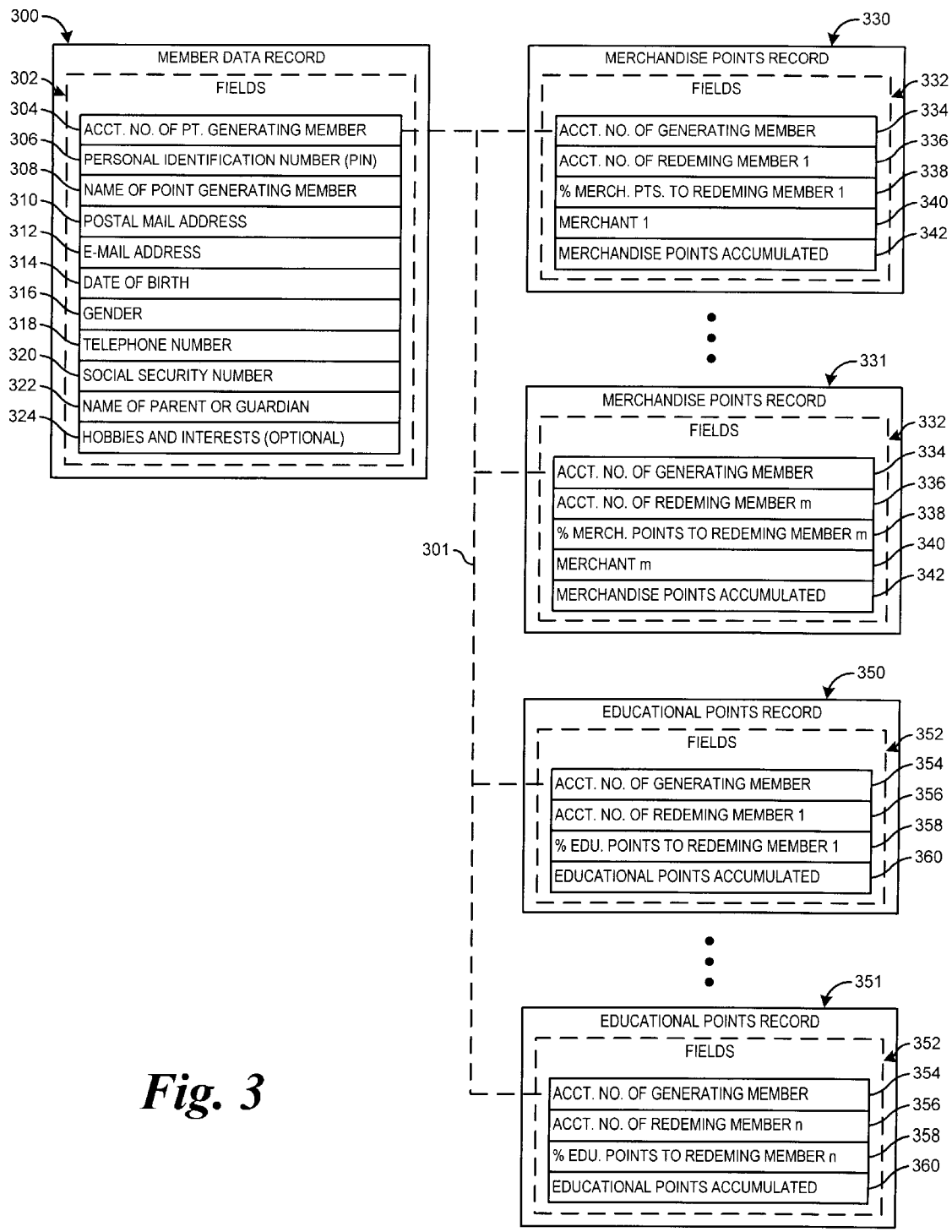
FIG. 3 is a schematic diagram of a member record which may be processed and stored in a database of the computer of FIG. 2.

FIG. 3 exemplifies a main record 300, a plurality of merchandise point records 330 and 340, and a plurality of educational point records 350 and 360, related to the main record 300 as indicated by the dashed line 301, all of which records are created and maintained in the database 206 of the computer 112 for each member 116. Each of the records 300, 330, 340, 350, and 360 include a number of different fields 302, 332, 343, 352, and 362, respectively, for recording data regarding a respective member 116. Notably, each record 300, 330, 340, 350, and 360 includes an account number field 304, 334, 344, 354, and 364, respectively, by which the records 330, 340, 350, and 360 are related. The account number fields 304, 334, 344, 354, and 364 store the same account number of a member 116 who generates points through purchases of merchandise.

The main record 300 preferably further includes a personal identification number (PIN) field 306 for storing a PIN for each member 116 whose account number is stored in the field 304. The fields 302 further include a member name field 308, a postal mail address field 310, an e-mail address field 312, a date of birth field 314, a gender field 316, a telephone number field 318, and a social security number field 320. A parent or guardian name field 322 is provided which stores the name of a parent or guardian of a minor 120, for reasons discussed below, if the respective record 300 is created for a minor 120. If the record 300 is being created for an adult 130, then the parent/guardian field 322 will be empty. A field 326 is provided for the optional entry of hobbies and other interests of the member 116 for whom the record 300 is respectively being established.

The merchandise point records 330–331 are configured for tracking merchandise points generated by the member identified in the record 300. The records 330–331 are shown in FIG. 3 separated by an ellipsis to indicate that there may be any number "m" of such merchandise point records associated with each member. Because the records 330–331 are structurally identical, they will be described representatively herein with reference to the record 330. The merchandise points record 330 comprises a number of fields 332, including an account number field 334 for storing the account number of the member identified in the field 304 of the record 300 as the point generating member; the contents of the field 334 are thus identical to contents of the field 304. The merchandise points record 330 further includes an account number field 336 for storing the account number of a member 1–m who is selected by the member identified in the respective field 334 for being entitled to redeem the merchandise points recorded in the corresponding record 330. The field 338 stores a number representing the percentage of total points generated by the member identified in the respective field 334 which the member identified in the respective field 336 is entitled to, and is used only in the calculation of points, discussed below. The field 340 is used for storing the name of a merchant 1–m by whom the merchandise points recorded in the record may be redeemed. The field 342 is used to record merchandise points as they accumulate by the member identified in the respective field 334 for the member identified in the respective field 336.

The educational point records 350–351 are configured for tracking merchandise points generated by the member identified in the record 300. The records 350–351 are shown in FIG. 3 separated by an ellipsis to indicate that there may be any number "n" of such educational point records associated with each member. Because the records 350–351 are structurally identical, they will be described representatively herein with reference to the record 350. The merchandise points record 350 comprises a number of fields 352, including an account number field 354 for storing the account number of the member identified in the respective field 304 of the respective record 300 as the point generating member; the contents of the field 354 are identical to contents of the corresponding field 304. The educational points record 350 further includes an account number field 356 for storing the account number of a member 1–n who is selected by the member identified in the respective field 354 for being entitled to redeem the merchandise points recorded in the respective record 350. The field 358 stores a number representing the percentage of total points generated by the member identified in the respective field 354 which the member identified in the respective field 356 is entitled to, and is used only in the calculation of points, discussed below. The field 360 is used to record educational points as they are generated and accumulated by the member identified in the respective field 354 for the member identified in the respective field 356.

The records 300, 330–331, and 350–351 and the corresponding fields 302, 332, and 352 stored in the database 206 in the computer 112 may be organized differently, and may include more or fewer records and/or fields for each member. The structure and development of databases is considered to be well-known in the art and, therefore, will not be discussed in further detail herein.

Figure 4:
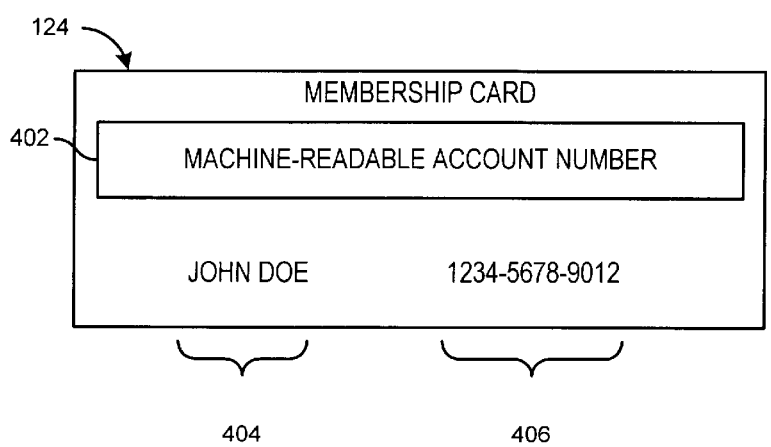
FIG. 4 is a schematic diagram of a club card which may be used by a member participating in the system of FIG. 1.

Referring to FIG. 4, the club card 124 is exemplified as preferably containing a machine-readable code 402 representing the account number 304 of the card holder, imprinted on the card in a conventional format, such as bar code, magnetic code, or the like, which is readable by the card reader 144. The card 124 preferably also includes, imprinted in human-readable format at two fields 404 and 406 on the card, the name and account number respectively, as contained in the fields 304 and 308 of the member's record 300. Optionally, the card 124 may also include an expiration date (not shown), beyond which date the club card 124 is invalid.

Figure 5:
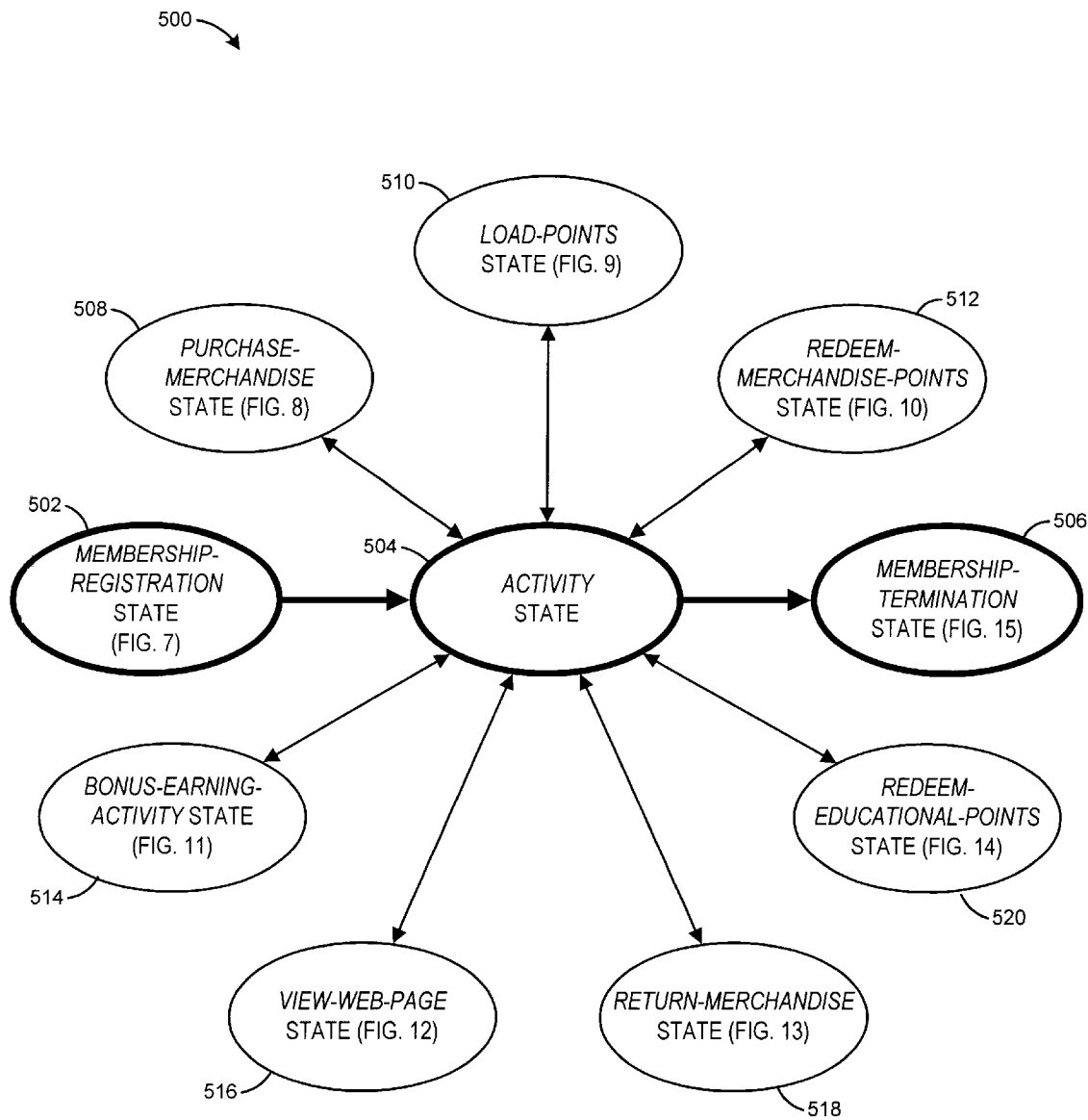
FIG. 5 is a high-level state diagram which depicts the operation of the system of FIG. 1.

FIG. 5 shows a representative high-level state diagram 500 which depicts states through which an individual person may pass during and subsequent to becoming a member of the club 110, in accordance with a preferred embodiment of the present invention. While described herein with respect to an individual member 116, the states depicted in FIG. 5 may be experienced by each of any number of members 116, such as the members 120 and 130.

As shown in FIG. 5 and described in further detail below, a non-member 190 may pass through a MEMBER-REGISTRATION state 502, wherein the non-member acquires membership in the club 110, an ACTIVITY state 504 in which a member 116 may engage in a number of different transactional activities, and a MEMBERSHIP-TERMINATION state 506 in which the member terminates membership in the club 110. As will be described in greater detail below, during the ACTIVITIES state 504, each of at least seven activities may be performed any number of times, in any sequence, and are tabulated as follows, in no particular sequence:

| Ref. | FIG. | State |
|------|------|-------|
| 508 | 8 | PURCHASE-MERCHANDISE |
| 510 | 9 | LOAD-POINTS |
| 512 | 10 | REDEEM-MERCHANT-POINTS |
| 514 | 11 | BONUS-EARNING-ACTIVITY |
| 516 | 12 | VIEW-WEB-PACE |
| 518 | 13 | RETURN-PRODUCT |
| 520 | 14 | REDEEM-EDUCATIONAL-POINTS |

Figure 6A:
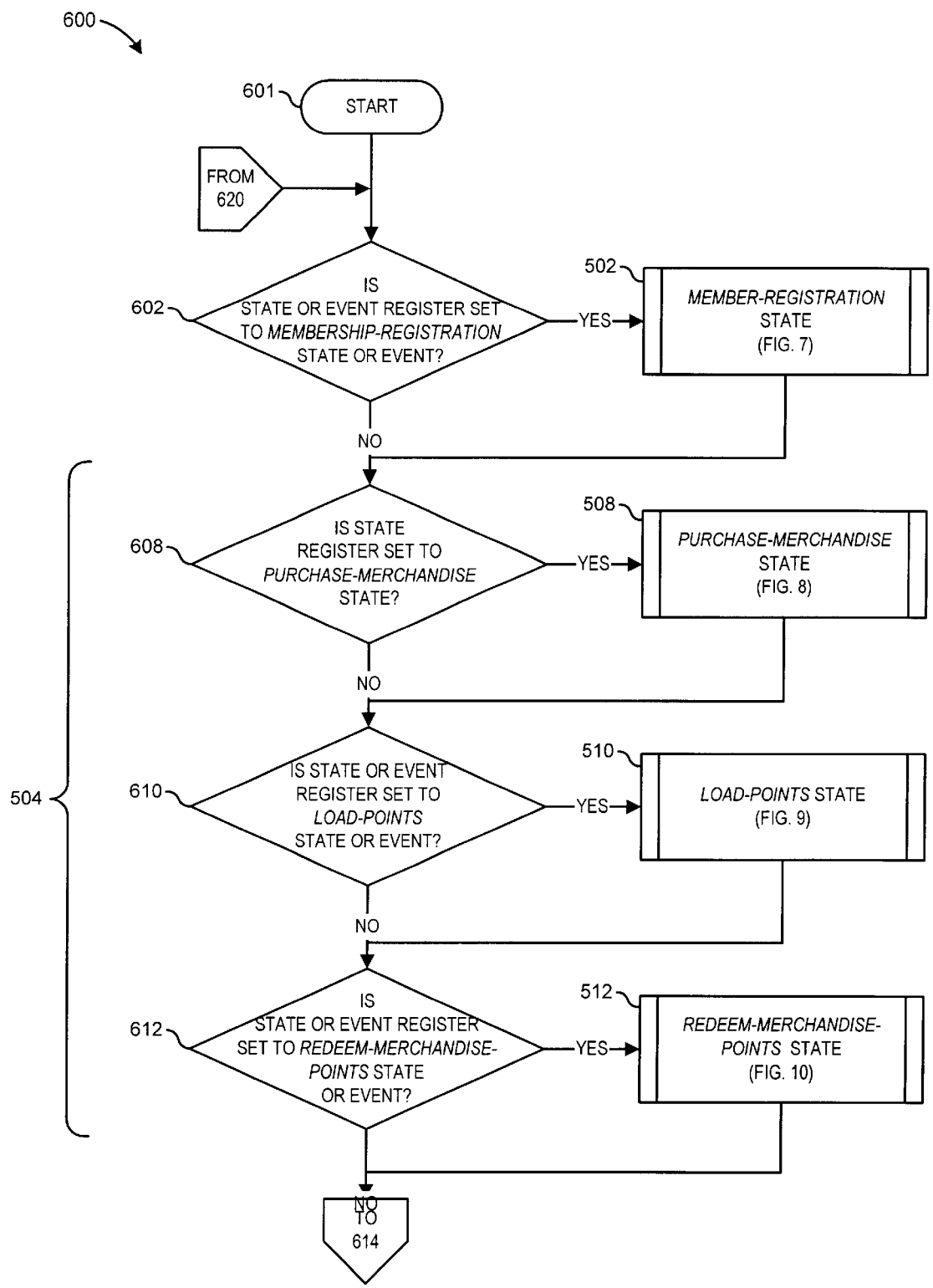
FIGS. 6A and 6B are a flow chart which depicts control logic utilized by a software program in the computer of FIG. 2 to implement the state diagram of FIG. 5.
Figure 6B:
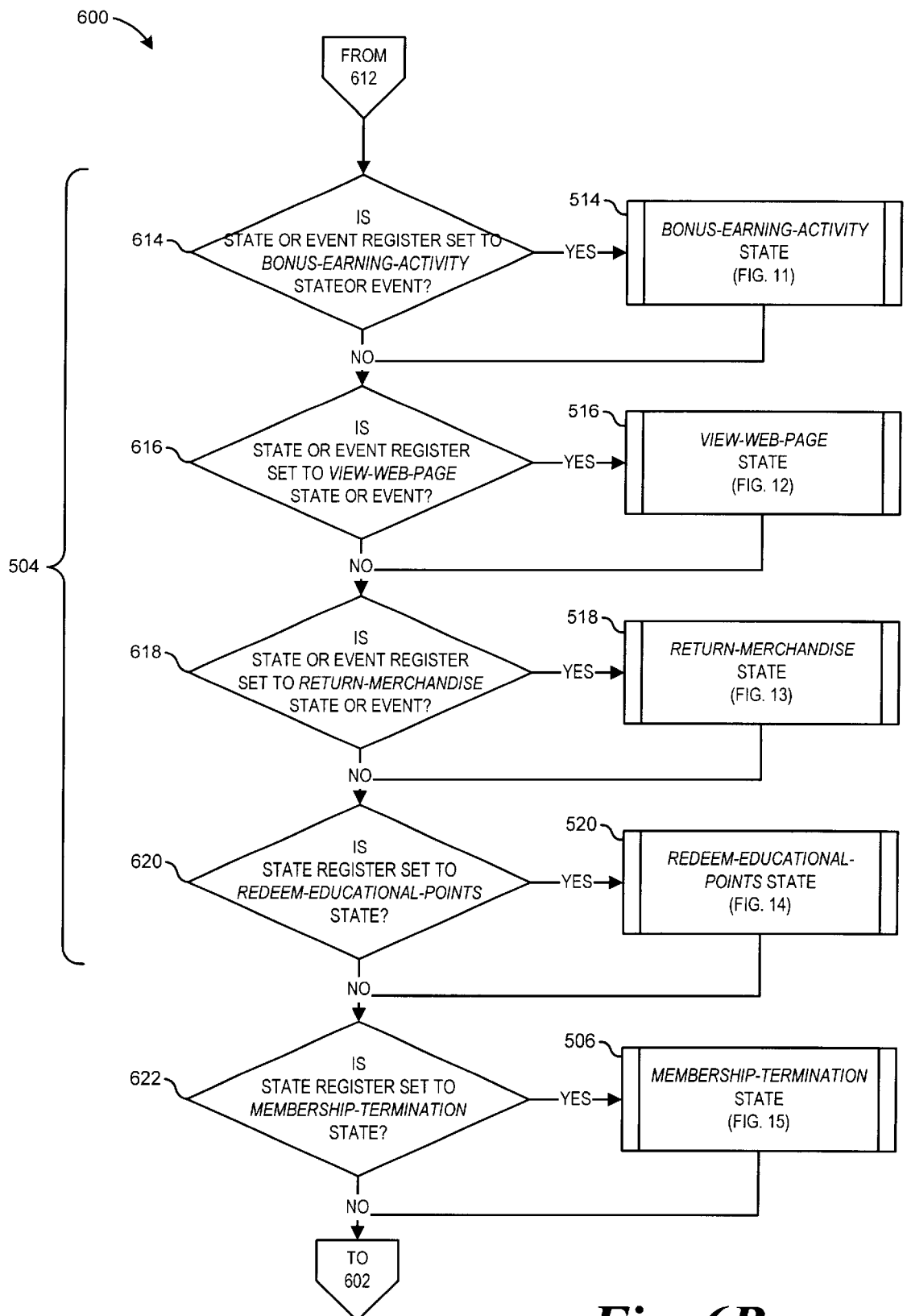

FIGS. 6A and 6B illustrate a representative high-level flowchart 600 of control logic utilized by the executable program 204 (FIG. 2) for implementing the state diagram 500 shown in FIG. 5, with respect to one member 116, in accordance with a preferred embodiment of the present invention. The control logic is initiated by interrupt requests (IRQs) and conventional Internet web page technology, well-known in the art and, therefore, will not be discussed in further detail herein.

In FIG. 6A, execution of the program 204 is initiated in step 601 and proceeds to step 602 wherein a determination is made whether the state register 208 or event register 210 is set to the MEMBER-REGISTRATION state or to an event therein. If it is determined that the register 208 or 210 is set to the MEMBER-REGISTRATION state or event, then execution enters an event of the MEMBER-REGISTRATION state 502, described in further detail below with respect to FIG. 7. Upon completion of events constituting the MEMBER-REGISTRATION state 502, execution proceeds to step 608. If, in step 602, it is not determined that the register 208 or 210 is set to the MEMBER-REGISTRATION state or event, then execution proceeds directly to step 608.

In step 608, a determination is made whether the state register 208 or event register 210 is set to the PURCHASE-MERCHANDISE state or to an event therein. If it is determined that the register 208 or 210 is set to the PURCHASE-MERCHANDISE state or to an event therein, then execution enters the PURCHASE-MERCHANDISE state 508, described in further detail below with respect to FIG. 8. Upon completion of events constituting the PURCHASE-MERCHANDISE state 510, execution proceeds to step 610. If, in step 608, it is not determined that the register 208 or 210 is set to the PURCHASE-MERCHANDISE state or to an event therein, then execution proceeds directly to step 610.

In step 610, a determination is made whether the state register 208 or event register 210 is set to the LOAD-POINTS state or to an event therein. If it is determined that the register 208 is set to the LOAD-POINTS state or an event therein, then execution enters the LOAD-POINTS state 510, described in further detail below with respect to FIG. 9. Upon completion of events constituting the LOAD-POINTS state 510, execution proceeds to step 612. If, in step 610, it is not determined that the register 208 or 210 is set to the LOAD-POINTS state, then execution proceeds directly to step 612.

In step 612, a determination is made whether the state register 208 or event register 210 is set to the REDEEM-MERCHANDISE-POINTS state or to an event therein. If it is determined that the register 208 or 210 is set to the REDEEM-MERCHANDISE-POINTS state or to an event therein, then execution enters the REDEEM-MERCHANDISE-POINTS state 512, described in further detail below with respect to FIG. 10. Upon completion of events constituting the REDEEM-MERCHANDISE-POINTS state 512, execution proceeds to step 614. If, in step 612, it is not determined that the register 208 or 210 is set to the REDEEM-MERCHANDISE-POINTS state or to an event therein, then execution proceeds directly to step 614.

With reference to FIG. 6B, in step 614, a determination is made whether the state register 208 or event register 210 is set to the BONUS-EARNING-ACTIVITY state or to an event therein. If it is determined that the register 208 is set to the BONUS-EARNING-ACTIVITY state or an event therein, then execution enters the BONUS-EARNING-ACTIVITY state 514, described in further detail below with respect to FIG. 11. Upon completion of events constituting the BONUS-EARNING-ACTIVITY state 514, execution proceeds to step 616 (FIG. 6B). If, in step 614, it is not determined that the register 208 or 210 is set to the BONUS-EARNING-ACTIVITY state or to an event therein, then execution proceeds directly to step 616.

In step 616, a determination is made whether the state register 208 or event register 210 is set to the VIEW-WEB-PAGE state. If it is determined that the register 208 or 210 is set to the VIEW-WEB-PAGE state, then execution enters the VIEW-WEB-PAGE state 516, described in further detail below with respect to FIG. 12. Upon completion of events constituting the VIEW-WEB-PAGE state 516, execution proceeds to step 618. If, in step 616, it is not determined that the register 208 or 210 is set to the VIEW-WEB-PAGE state or to an event therein, then execution proceeds directly to step 618.

In step 618, a determination is made whether the state register 208 or event register 210 is set to the RETURN-PRODUCT state or to an event therein. If it is determined that the register 208 or 210 is set to the RETURN-PRODUCT state, then execution enters the RETURN-PRODUCT state 518, described in further detail below with respect to FIG. 13. Upon completion of events constituting the RETURN-PRODUCT state 518, execution proceeds to step 620. If, in step 618, it is not determined that the register 208 or 210 is set to the RETURN-PRODUCT state or to an event therein, then execution proceeds directly to step 620.

In step 620, a determination is made whether the state register 208 or event register 210 is set to the REDEEM-EDUCATIONAL-POINTS state. If it is determined that the register 208 or 210 is set to the REDEEM-EDUCATIONAL-POINTS state, then execution enters the REDEEM-EDUCATIONAL-POINTS state 520, described in further detail below with respect to FIG. 14. Upon completion of events constituting the REDEEM-EDUCATIONAL-POINTS state 520, execution proceeds to step 622. If, in step 620, it is not determined that the register 208 or 210 is set to the REDEEM-EDUCATIONAL-POINTS state, then execution proceeds directly to step 622.

In step 622, a determination is made whether the state register 208 or event register 210 is set to the MEMBERSHIP-TERMINATION state or to an event therein. If it is determined that the register 208 or 210 is set to the MEMBERSHIP-TERMINATION state, then execution enters the MEMBERSHIP-TERMINATION state 520, described in further detail below with respect to FIG. 14. Upon completion of events constituting the MEMBERSHIP-TERMINATION state 520, execution of the flow chart 600 for a respective member 116 terminates. If, in step 622, it is not determined that the register 208 is set to the MEMBERSHIP-TERMINATION state, then execution returns to step 602.

FIGS. 7–12 and 14 depict preferred messaging and event sequences between entities according to principles of the present invention. It should be noted, however, that in alternative embodiments, the sequencing of events may differ. It should also be noted that in FIGS. 7–12 and 14, events occur chronologically from the top of the diagram to the bottom of the diagram. It should still further be noted that references in FIGS. 7–12 and 14 to the entities 110, 120, 130, 140, 150, 160, 170, and 180 include the respective computers 112, 122, 132, 142, 152, 162, 172, and 182, and that events which transpire between such computers occur through the network 102.

Figure 7:
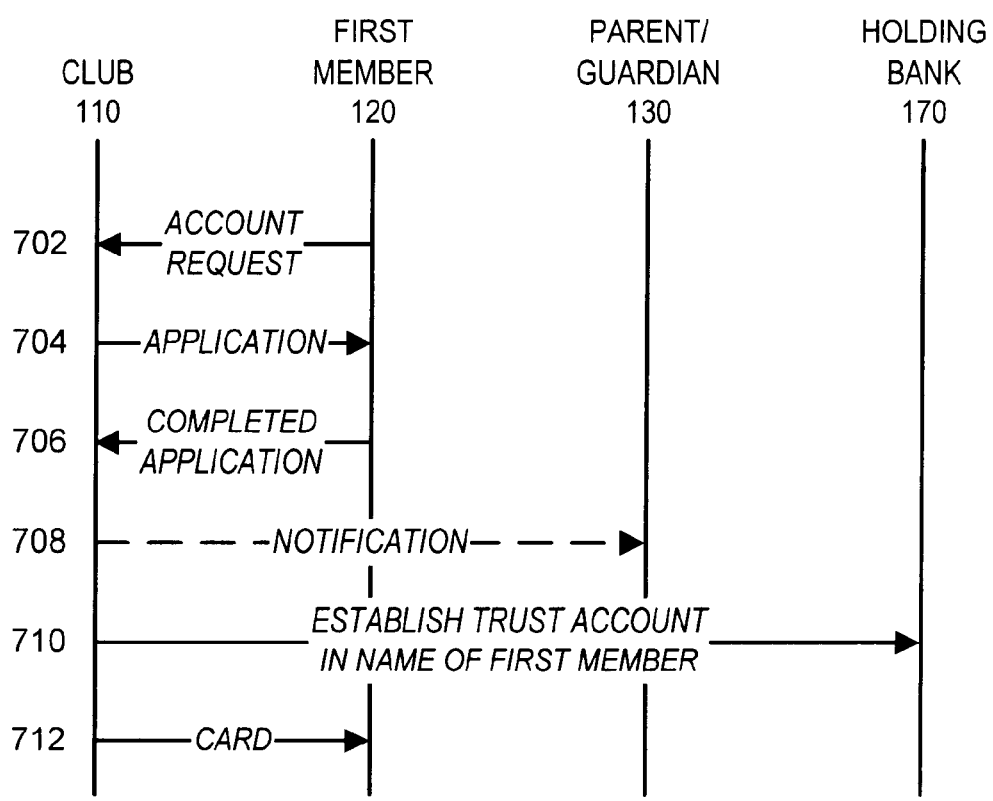
FIG. 7 is an event sequence diagram which depicts events which transpire when a person applies to become a member of a club defined by the system of FIG. 1.

FIG. 7 is an event sequence diagram depicting preferred events that transpire during the MEMBER-REGISTRATION state 502 (FIG. 5), in which a non-member 190 joins and becomes a member 116 of the club 110. For the sake of illustration, the non-member 190 will be represented by the person 120 as a non-member prior to becoming the member 120. In the event 702, the person 120 as a non-member may join the club 110 preferably by locating, via the non-member's computer 122, the network 102, and the club computer 112, the web page of the club 110 and requesting an electronic application form, including self-explanatory instructions and prompts. Web pages and their operation on the Internet are considered to be well-known and will, therefore, not be described in detail herein. During the event 704, the state register 208 (FIG. 2) of the computer 112 is set to the MEMBER-REGISTRATION state 502, and the application form is sent to the person 120, as a non-member, via the web page through the network 102 and the computer 122. The application form preferably requires, as a minimum, that the person 120, as a non-member, provide data to be stored in each of the fields 304–322, as described above with respect to FIG. 3. In the event 706, the person 120, as a non-member, completes the application form by following the self-explanatory instructions and prompts on the web page, and returns the application form, via the computer 122 and the network 102, to the computer 112 of the club 110. As indicated by event 708 in dashed line, if the person 120 is a minor, the club 110 sends notification to the parent(s)/guardian listed in the field 322 of the record 300 of the person 120, notifying the parent/guardian that their son/daughter has requested membership in the club 110. As indicated by event 710, the club 110 then establishes an education account (or, alternatively, a trust account) at the holding bank 170 in the name of the member, in step 712 sends a club card 124 to the person 120, as a member, and the state register 208 (FIG. 2) of the computer 112 exits from the MEMBER-REGISTRATION state 502. In an alternative embodiment of the present invention, the person 120 may obtain, complete, and return an application to join the club 110 and obtain a club card 124 via a kiosk located, for example, at a shopping mall, by physically appearing at the club 110, by conventional postal mail, by telephone, or the like, or a combination of any of the foregoing.

Figure 8:
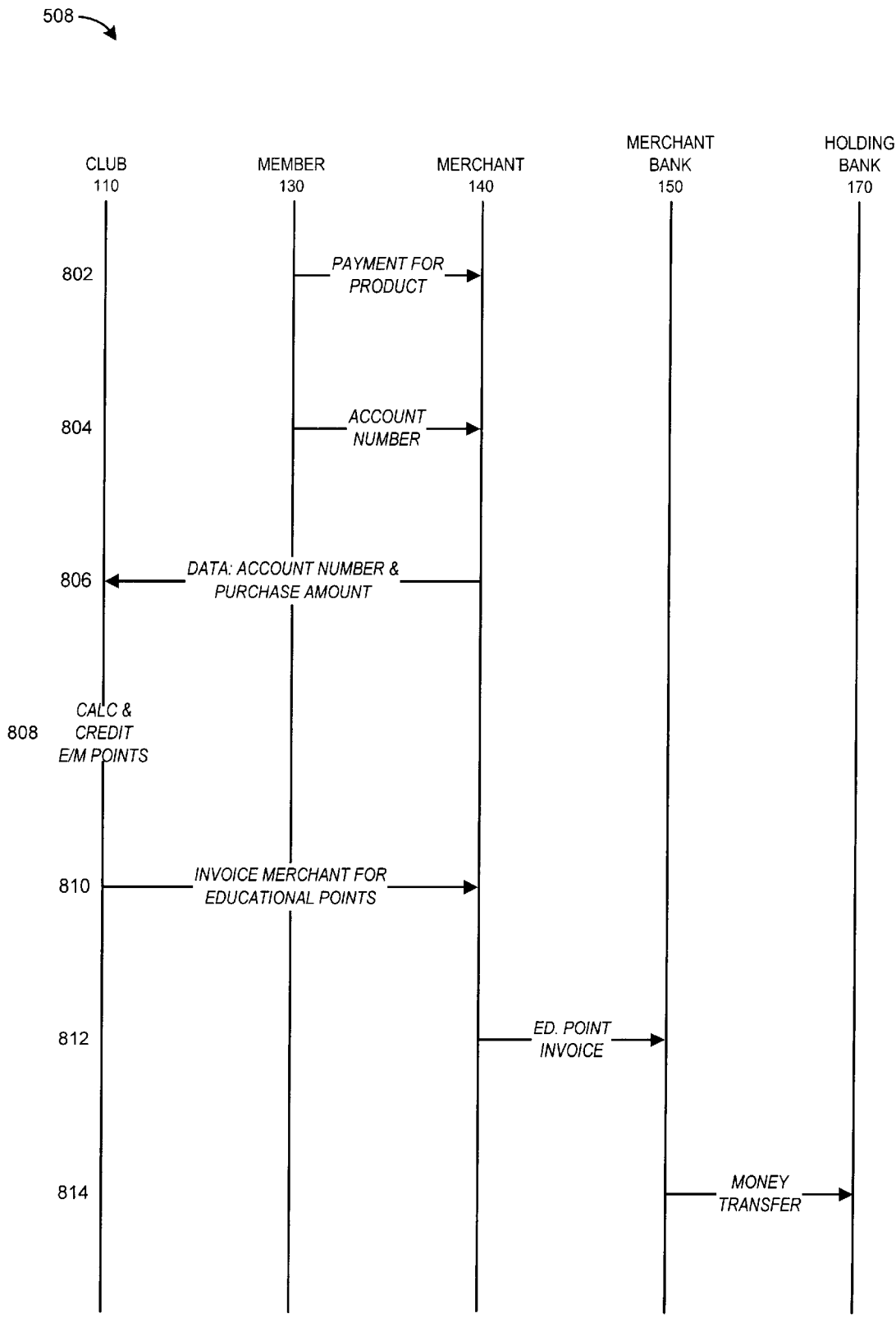
FIG. 8 is an event sequence diagram which depicts events which transpire when a member purchases a product without points in accordance with the present invention.

During the PURCHASE-MERCHANDISE state 508 (FIG. 5), the member 116 purchases merchandise (not shown) from the merchant 140, without using points (discussed below), in accordance with a preferred embodiment of the present invention. As shown in FIG. 8, during an event 802, a member 116 appears either in person at the merchant 140 place of business or on-line at the merchant 140 web page, selects merchandise, and pays for the merchandise with cash, check, or credit card, and the amount of the purchase is entered into the merchant computer 142. During an event 804, the member 116 gives his/her club member account number stored in the fields 304, 402, and 406 to the merchant 140. If the member is present at the merchant's place of business, then the event 804 may be performed, for example, by either the member 116 or the merchant 140 swiping the member's club card 124 through the card reader 144 in a conventional manner so that the card reader 144 reads the account number 402 (FIG. 4) embedded onto the card 124. Alternatively, the account number on the card 124 may be manually entered by the member 116 or merchant 140 into the computer 142. In still a further alternative, if the member 130 is on-line at the merchant's web page, then the event 804 may be performed, for example, by the member entering his/her account number 406, printed on the card 124, via the web page to the merchant 140. Upon receipt of the member's account number, the card reader 144 enters the account number into the computer 142.

During or subsequent to an event 806, the merchant computer 142 sends the read account number, as well as the amount of the purchase made in the event 802, through the computer 142 and the network 102 to the club computer 112 of the club 110. Upon receipt of the account number and the amount of the purchase made in the event 802, the state register 208 (FIG. 2) of the computer 112 is set to the PURCHASE-MERCHANDISE state 508. The club computer 112 is configured to then calculate, during an event 808, a number of educational and merchant ("E/M") "points" to be credited to the member 116, preferably as a percentage, such as 4% and 3%, respectively, of the amount paid to purchase the merchandise from the merchant 140. The club computer 112 stores in the respective fields 326 and 328 of a record 300 in the database 206 the calculated educational and merchandise points credited to the respective member 116.

In an alternate embodiment, the CCI bank 160 may operate as a processing agency to calculate and track the merchandise points, and the club 110 may calculate and track only educational points. Still further, the step 806 may be performed in either real time or in batch mode wherein data is purchase data is accumulated and transferred by the merchant to the club 110 and/or CCI bank 160 only at predetermined times, such as once a day, or once a week.

During an event 810, the club computer 112 determines the amount of money that corresponds to the number of educational credits calculated during the event 808. The value of each point is determined by agreement between the club 110 and the respective merchant 140; each point may, for example, represent one dollar. The club computer 112 then generates an invoice for the determined amount of money, and sends the invoice via the network 102 to the merchant computer 142. In response to receipt of the invoice, the merchant computer 142 directs the merchant bank computer 152, during an event 812, to transfer the invoiced amount of money to the holding bank 170. During an event 814, the merchant bank 150 transfers the determined amount of money to the holding bank 170, which then retains the money in a trust account set up for the member 120 that made the purchase during the event 802. The transfer of money may be implemented in a manner well-known in the art, such as, for example, via wire, courier, registered mail, or the like. The state register 208 (FIG. 2) of the club computer 112 then exits from the PURCHASE-MERCHANDISE state 508.

Figure 9:
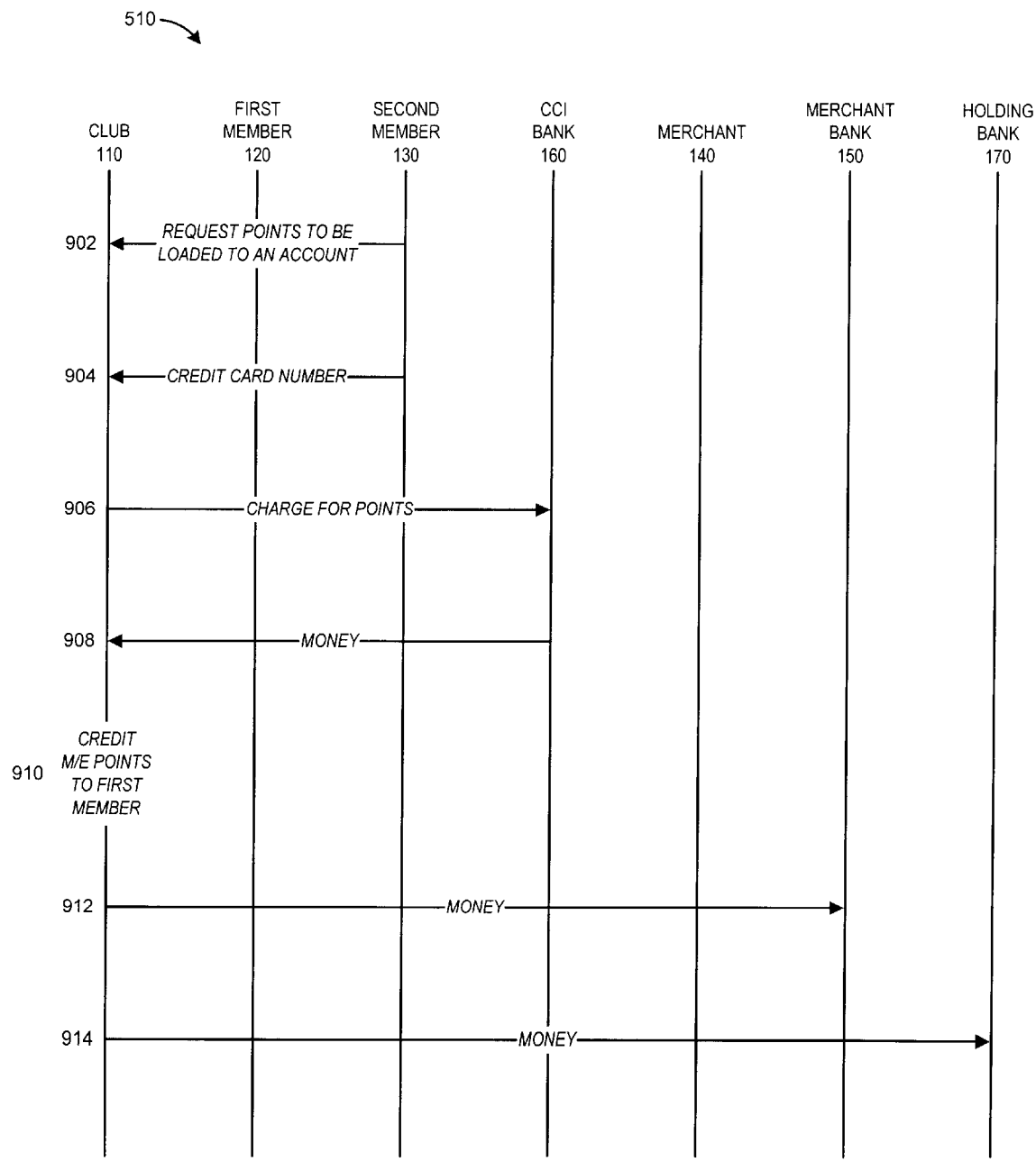
FIG. 9 is an event sequence diagram which depicts events which transpire when a member purchases points to apply to a member account in accordance with the present invention.

FIG. 9 is an event sequence diagram which depicts events which transpire during the LOAD-POINTS state 510 when a member purchases points to apply to a member account in accordance with a preferred embodiment of the present invention. In event 902, the second member 130 enters a request to the club 110 to permit him to load points to a selected account 336, namely the first member 120 for the sake of illustration herein. In event 904, the second member 130 gives the account number of his credit card 134 to the club 110, along with authorization to charge to the credit card 134 the amount of money required to load the desired number of points to an account for the second member 120. In event 906, the club 110 passes the charge for the points to the CCI bank 160. In event 908, the bank 160 preferably transfers the money to the club 110 and, in event 910, the club transfers the credits the points to the account of the first member 120. In event 912, the club 110 transfers the money received in event 908 to the merchant bank 150 and to the holding bank 170 as specified by the second member 130. Alternatively, events 908, 912, and 914 may be performed by the CCI bank transferring money directly to the merchant 140, the merchant bank 150, and/or the holding bank 170, thereby bypassing the club 110.

Figure 10:
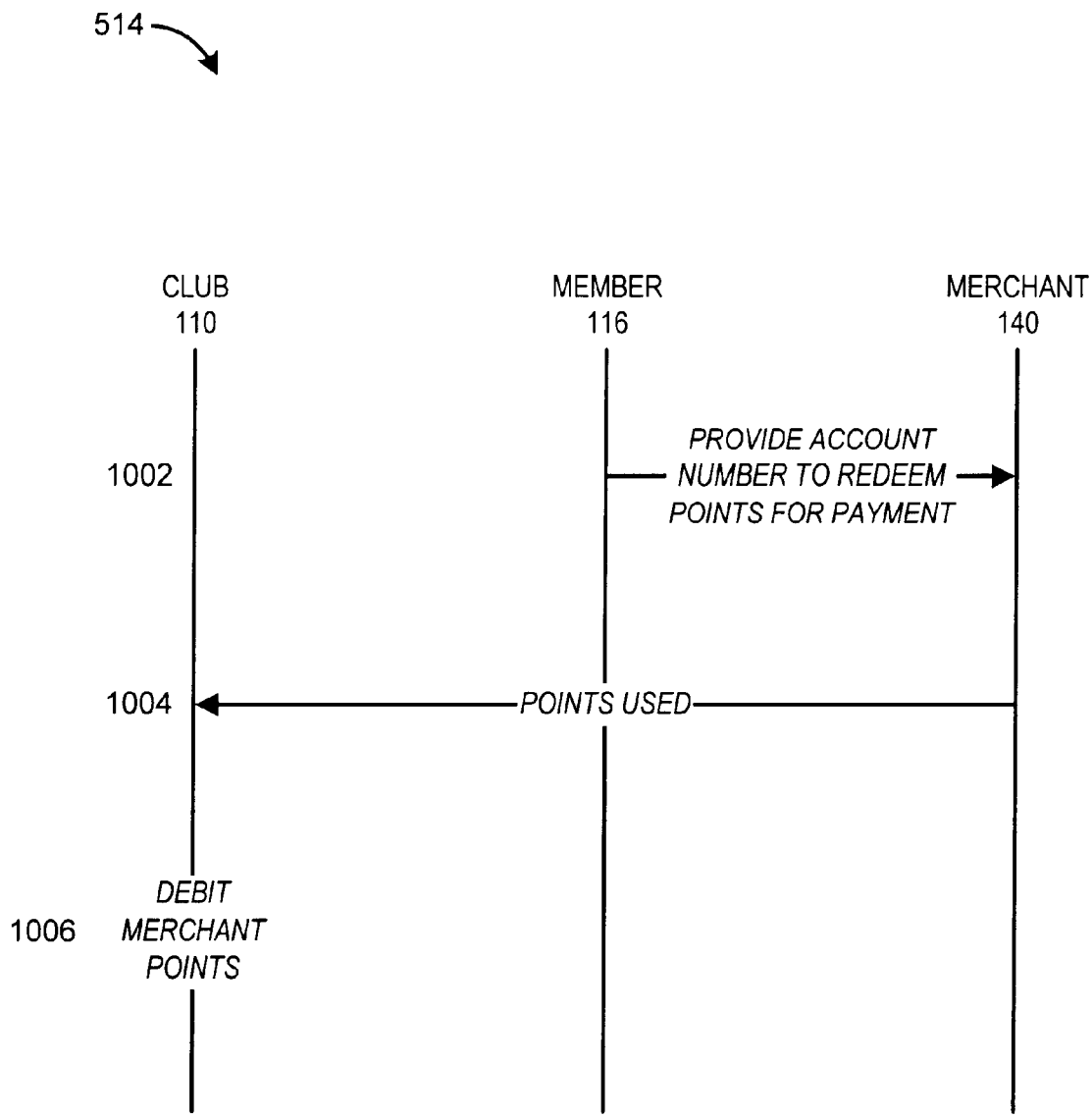
FIG. 10 is an event sequence diagram which depicts events which transpire when a member purchases a product with points in accordance with the present invention.

FIG. 10 is an event sequence diagram which depicts events which transpire during the REDEEM-MERCHANDISE-POINTS state 512 when a member redeems merchandise points, i.e., purchases a product with points, in accordance with a preferred embodiment of the present invention. In event 1002, a member 116, such as the first member 120, provides his/her club membership account number to a merchant 140. Event 1002 may be performed either on-line or in person. In event 1004, a record of the points redeemed are forwarded to the club 110, and in event 1006, the club 110 debits the first member's account with the number of points redeemed.

Figure 11:
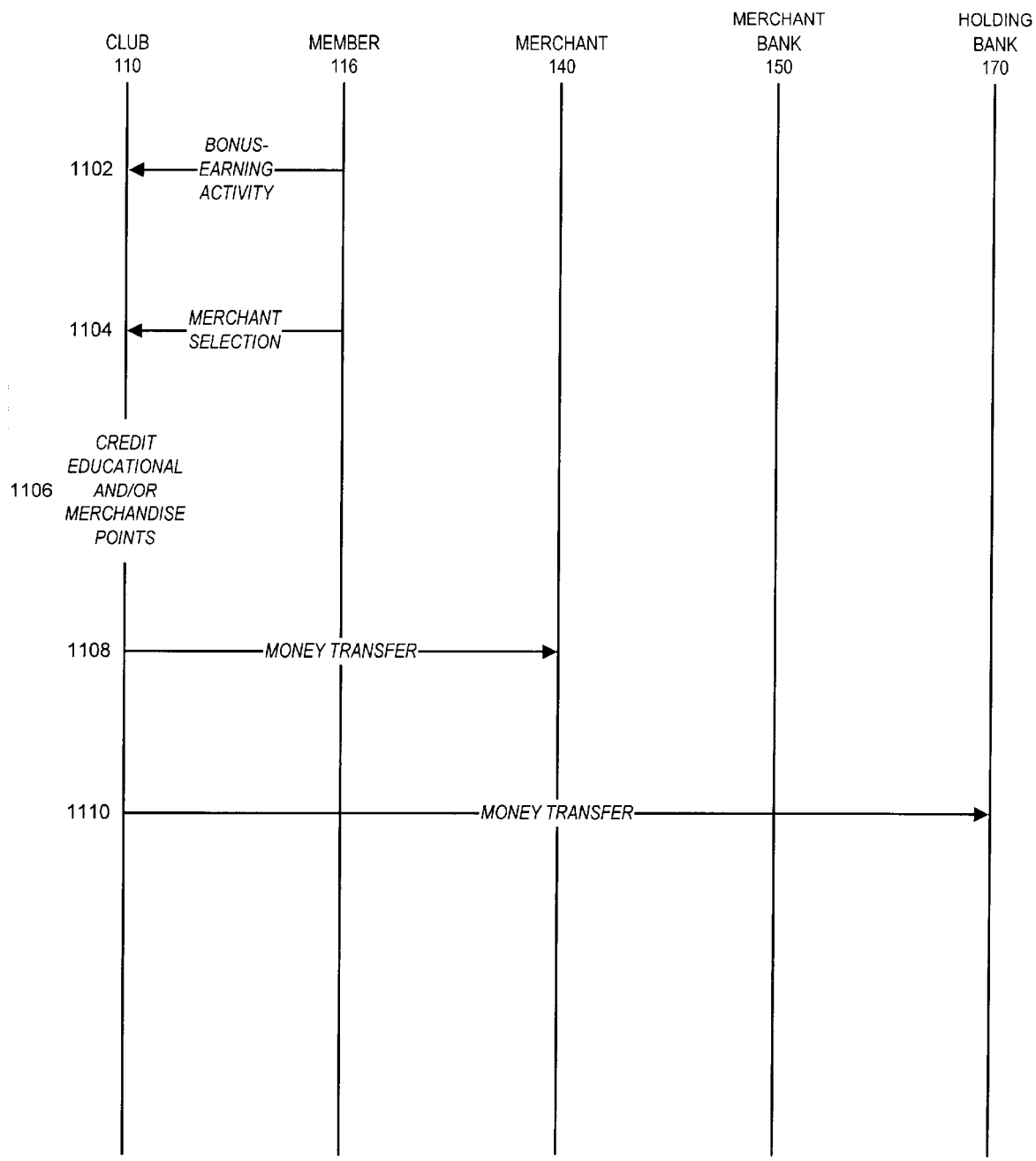
FIG. 11 is an event sequence diagram which depicts events which transpire when a member performs activities by which he earns points in accordance the present invention.

FIG. 11 is an event sequence diagram which depicts events which transpire during the BONUS-EARNING-ACTIVITY state 514 when a member performs activities by which he earns merchandise points in accordance with a preferred embodiment of the present invention. In event 1102, in exchange for a predetermined amount of points, a member 116 performs activities such as, for example, acquiring a predetermined number of points within a predetermined period of time, or by telling another person about the club 110, which person as a result then joins the club. A non-member 190 may also earn points by completing registration to be a member. An event 1104, the member 116 identifies a merchant 140 to whom the member would desire the points be applied. In event 1106, the club credits the account of the member 116 with the predetermined amount of points. Optionally, the club 110 may also credit the member 116 with educational points. In event 1108, the club transfers money corresponding to the the credited merchandise points preferably to the merchant 140, or alternatively to the merchant bank 150. In event 1110, the club optionally transfers money corresponding to the credited educational points to the holding bank 170.

Figure 12:
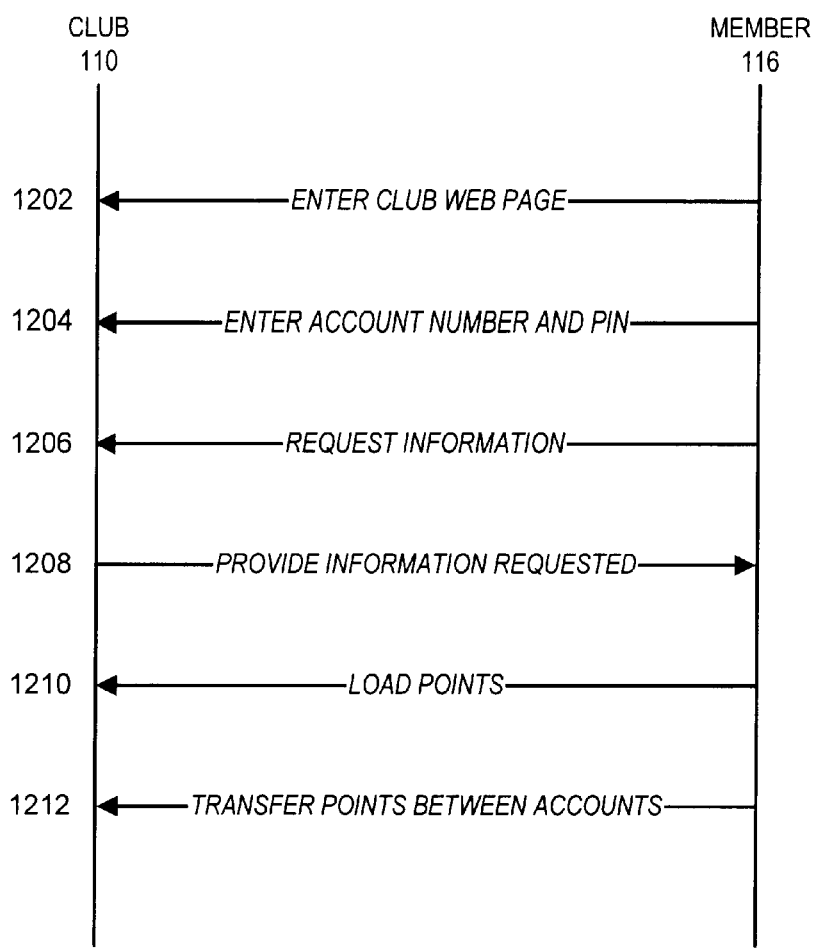
FIG. 12 is an event sequence diagram which depicts events which transpire when a member views a club web page.

FIG. 12 is an event sequence diagram which depicts events which may transpire during the VIEW-WEB-PAGE state 516 when a member 116 views a club web page. In event 1202, the member 116 goes to the club web page, which includes non-proprietary information such as information about the club and membership registration, club rules and regulations, and a list of participating merchants in a particular area based on, for example, zip codes, area codes, or the like. In event 1202, the member 116 goes to the club web page, and in event 1204, the member 116 enters his/her club member account number and PIN to access confidential information relating to his/her own account, and to transfer points between accounts. In event 1206, the member 116 requests information, such as discussed above with respect to FIG. 3, including points accumulated and redeemed at participating merchants 140, that is made available on the web page, in any of a number of different well-known manners. In event 1208, the information requested in event 1206 is provided. In event 1210, the member may load points to accounts, as discussed above with respect to FIG. 9. In event 1212, the member may transfer points between accounts, as depicted in FIG. 3.

Optionally, the merchants 140 may also advertise at the web site, and may tailor ads to a specific market or sub-market segments, and to specific customer bases. The club 110 may also include on the web page "events of life" relevant to a member, such as a member's birthday, or graduation from high school, and the like.

Figure 13:
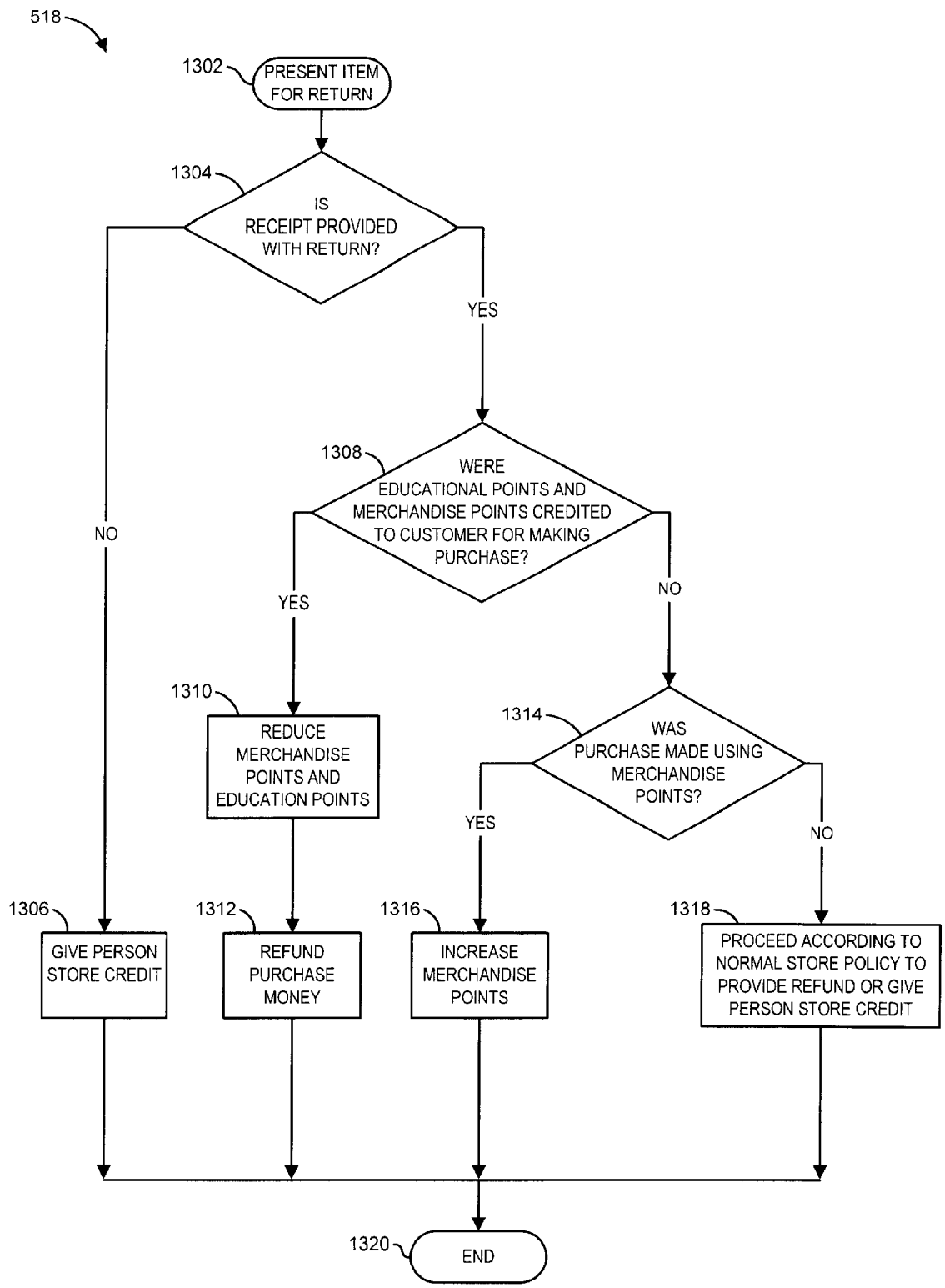
FIG. 13 is a flow chart which depicts control logic utilized when merchandise purchased in accordance with the present invention is returned to a merchant.

FIG. 13 is a flow chart which depicts control logic utilized during the RETURN-MERCHANDISE state 518 when a merchandise (not shown) purchased in accordance with the present invention is returned by a member to a merchant. In step 1302, the merchandise to be returned is presented by a member 116 to the merchant 140. In step 1304, the merchant 140 determines whether a receipt has been provided with the merchandise. If no receipt is provided, then execution proceeds to step 1306 wherein the merchant gives the member 116 store credit. Execution then terminates at step 1320.

If, in step 1304, the merchant 140 determines that there is a valid receipt provided with the returned merchandise, then execution proceeds to step 1308 wherein the merchant 140 determines whether educational and/or merchandise points were credited to the member 116 for making the purchase. If the merchant 140 determines that educational and/or merchandise points were credited to the member 116 for making the purchase, then in step 1310, the merchandise points and educational points given for the purchase are reduced by the amount they had previously been increased by the purchase. In step 1312, the refund money used to make the purchase is refunded. Execution then terminates at step 1320.

If in step 1308, the merchant 140 determines that educational and/or merchandise points were not credited to the member 116 for making the purchase, then execution proceeds to step 1314 wherein the merchant 140 determines whether the purchase was made by redeeming merchandise points, discussed above with respect to FIG. 10. If the merchant determines that purchase was made by redeeming merchandise points, then the merchandise points used to make the purchase are returned such that the member's account of points is increased. Execution then terminates at step 1320.

If in step 1314 the merchant 140 determines that the purchase was not made by redeeming merchandise points, then the merchant 140 proceeds according to normal store policy to provide the member 116 with a refund or store credit. Execution then terminates at step 1320.

Figure 14:
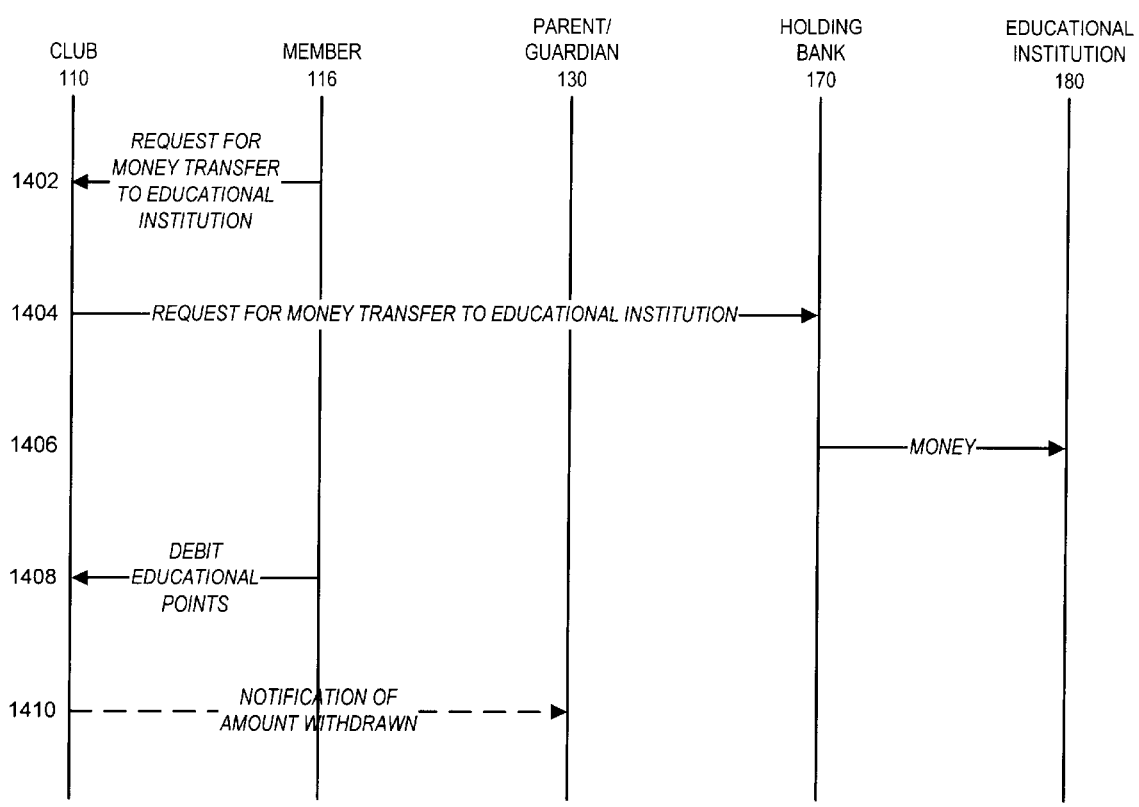
FIG. 14 is an event sequence diagram which depicts events which transpire when a member redeems educational points.

FIG. 14 is an event sequence diagram which depicts events which transpire during the REDEEM-EDUCATIONAL-POINTS state 520 when a member redeems educational points. In event 1402, a member 116, preferably a minor member (e.g., under the age of eighteen), requests, preferably on-line via the club web page, that the club 110 initiate the transfer of money equivalent to either all or a portion of the educational points credited to the member's account. Included in the request is the name of the educational institution to which the member 116 desires that the money be transferred. The club 110 may optionally make a determination whether the desired educational institution qualifies for the educational credits. Assuming that the educational institution qualifies for the educational credits, in event 1404, the club 110 delivers a request to the holding bank 170 requesting that the holding bank transfer appropriate monetary funds from the member's trust account to the indicated educational institution. In event 1406, the holding bank transfers the requested funds from the member's trust account to the educational institution. The transfer in event 1406 may be performed by any conventional methods, such as by wire via the network 102, postal mail service, or the like. In event 1408 the educational points of the member are debited by the amount transferred to the educational institution. If the member 116 is a minor, then in event 1410, the club 110 sends notification to the parent(s) and/or guardian(s) of the member 116.

Figure 15:
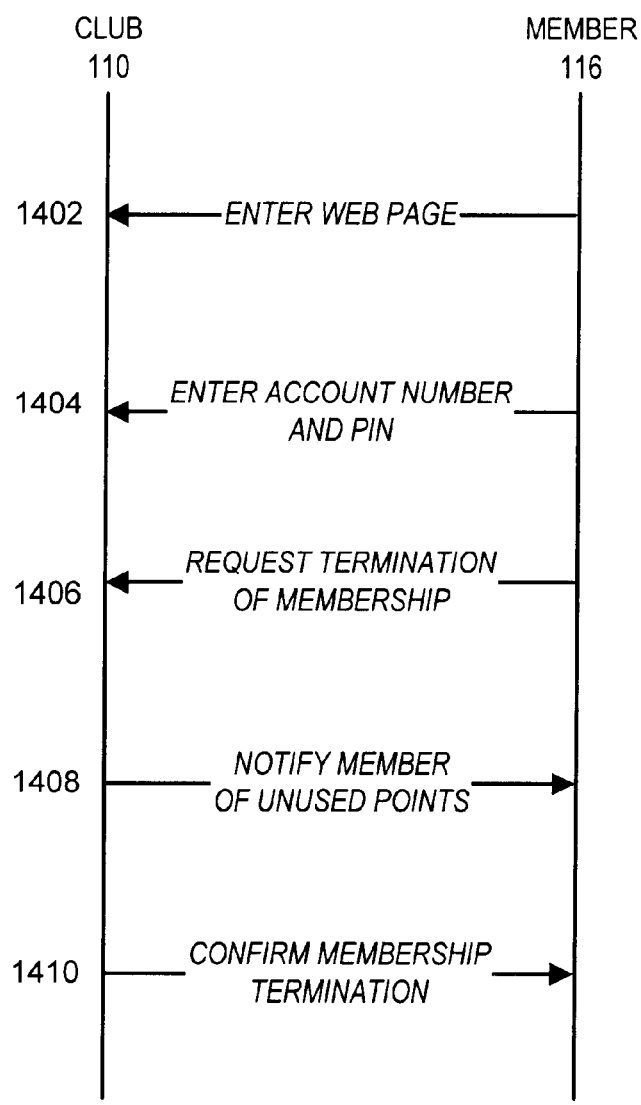
FIG. 15 is an event sequence diagram which depicts events which transpire when a member terminates membership in the club.

FIG. 15 is an event sequence diagram which depicts events which transpire during the MEMBERSHIP-TERMINATION state 506 when a member 116 terminates his/her membership in the club 110. In event 1402, a member 116 enters the club web page and, in event 1404, the member enters his/her account number and PIN. In event 1406, the member 116 requests termination of his/her membership in the club. In response, the club, in event 1408, issues to the member 116 a notification of outstanding points which have not been redeemed and informs the member of options available to him/her to redeem the points after membership termination, including the option of transferring unredeemed points to other members. In event 1410, the club sends confirmation to the member that his/her membership has been terminated. The club may optionally also send via postal mail service notice that membership has been terminated.

In addition to the foregoing discussion and description, additional aspects of a preferred embodiment of the present invention are further described and disclosed in Appendices A–H, which are hereby incorporated in their entirety by reference.

By the use of the present invention, "brick-and-mortar" retail stores may take advantage of the benefits of the Internet to better compete with e-commerce conducted over the Internet. By participating as a member of the club 110, merchants 140 gain an advertising medium through the club web page, are listed on the web page, and also gain loyalty of members 116 since incentives are provided via merchandise points to return to a store for further purchases. Minors may obtain the advantages of credits cards with club cards. Parents of minors also attain some peace of mind knowing that the club will provide funds for the minors to attend an educational institution such as college or a university.

It is understood that the present invention can take many forms and embodiments. Accordingly, several variations may be made in the foregoing without departing from the spirit or the scope of the invention. For example, merchants may be excluded from participation in the club if they directly compete with merchants who are already participating in the club. Merchandise points may be transferred from one merchant to another merchant. Marketing data, such as purchasing patterns of members 116, particularly minors, may be generated based on data received from purchases made through the club.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A data processing system for facilitating merchant transactions, the system comprising:

a) at least one computer for processing data relating to members of at least one group of persons;

b) storage means connected to the at least one computer, for storing to and retrieving from a database, data processed by the computer, wherein the database is configured for storing data regarding persons of the at least one group of persons, which data includes at least an account number of an account associated with respective persons;

c) means for entering into the computer data regarding the purchase by a purchaser of merchandise from a merchant for a specified amount of money;

d) means for calculating monetary points proportionate to a purchase made;

e) means for allocating the calculated monetary points between a first portion of points usable for the purchase of additional merchandise from the merchant, and a second portion of points usable for funding education at an educational institution;

f) means for crediting the first portion of points to a first person, and for crediting the second portion of points to a second person; and g) means for storing in the database in the storage means a record of the first portion of points credited to the first person and the second portion of points credited to the second person.

2. The system of claim 1 wherein the means for entering into the computer data regarding the purchase of merchandise further comprises means for entering an account number of a purchaser.

3. The system of claim 1 further comprising a card having an account number embedded thereon which account number is identified with the purchaser, and wherein the means for entering into the computer data regarding the purchase of merchandise further comprises means for reading an account number from the card and for incorporating the account number into the data regarding the purchase of merchandise.

4. The system of claim 1 wherein the means for entering into the computer data regarding the purchase of merchandise is connected to the computer through a global communication network.

5. The system of claim 1 wherein the means for entering into the computer data regarding the purchase of merchandise is connected to the computer through an Internet link.

6. The system of claim 1 wherein the means for entering into the computer data regarding the purchase by a purchaser is entered into the computer in real time.

7. The system of claim 1 wherein the means for entering into the computer data regarding the purchase by a purchaser is entered into the computer in a batch mode.

8. The system of claim 1 further comprising means for entering into the computer data regarding the purchase by the first person of merchandise from a merchant for a specified amount of merchandise points.

9. The system of claim 1 further comprising:
 a) a card having an account number embedded thereon which account number is identified with the first person;
 b) means for entering into the computer data regarding a purchase by the first person of merchandise from a merchant for a specified amount of merchandise points; and
 c) means for debiting the account identified by the account number.

10. The system of claim 1 wherein the first person and the second person are the same person.

11. The system of claim 1 wherein the second person is a minor.

12. The system of claim 1 wherein the computer is a first computer, and the system further comprises a second computer, and wherein the means for allocating the points further comprises means for the first computer to calculate the first portion of points and means for the second computer to calculate the second portion of points.

13. The system of claim 1 wherein the computer is first computer identified with a group of persons comprising the first person and the second person, and the system further comprises a second computer identified with a credit card issuing bank, and wherein the means for allocating the points further comprises means for the first computer to calculate the first portion of points and means for the second computer to calculate the second portion of points.

14. A data processing method for facilitating merchant transactions, the system comprising the steps of:
 a) connecting a storage means connected to at least one computer, for storing to and retrieving from a database, data processed by the computer, wherein the database is configured for storing data regarding persons of the at least one group of persons, which data includes at least an account number of an account associated with respective persons;
 b) entering into the computer data regarding the purchase by a purchaser of merchandise from a merchant for a specified amount of money;
 c) calculating monetary points proportionate to a purchase made;
 d) allocating the calculated monetary points between a first portion of points usable for the purchase of additional merchandise from the merchant and a second portion of points usable for funding education at an educational institution;
 e) crediting the first portion of points to a first person, and crediting the second portion of points to a second person; and
 f) storing in the database in the storage means a record of the first portion of points credited to the first person, and the second portion of points credited to the second person.

15. The method of claim 14 wherein the step of entering into the computer data regarding the purchase of merchandise further comprises the step of entering an account number of a purchaser.

16. The method of claim 14 further comprising a card having an account number embedded thereon which account number is identified with the purchaser, and wherein the step of entering into the computer data regarding the purchase of merchandise further comprises the step of reading an account number from the card and for incorporating the account number into the data regarding the purchase of merchandise.

17. The method of claim 14 wherein the step of entering into the computer data regarding the purchase of merchandise is a card reader configured for reading.

18. The method of claim 14 wherein the step of entering into the computer data regarding the purchase of merchandise is executed via a global communication network.

19. The method of claim 14 wherein the step of entering into the computer data regarding the purchase of merchandise is executed via an Internet link.

20. The method of claim 14 wherein the means for entering into the computer data regarding the purchase by a purchaser is entered into the computer in real time.

21. The method of claim 14 wherein the means for entering into the computer data regarding the purchase by a purchaser is entered into the computer in a batch mode.

22. The method of claim 14 further comprising means for entering into the computer data regarding the purchase by the first person of merchandise from a merchant for a specified amount of merchandise points.

23. The method of claim 14 further comprising:
 a) embedding an account number onto a card, which account number is identified with the first person;
 b) entering into the computer data regarding the purchase by the first person of merchandise from a merchant for a specified amount of merchandise points; and
 c) debiting the account identified by the account number.

24. The method of claim 14 wherein the first person and the second person are the same person.

25. The method of claim 14 wherein the second person is a minor.

26. The method of claim 14 wherein the computer is a first computer, and the method further comprises a second computer, and wherein the step of allocating the points further comprises the first computer calculating the first portion of points and the second computer calculating the second portion of points.

27. The method of claim 14 wherein the computer is first computer identified with a group of persons comprising the first person and the second person, and the method further comprises a second computer identified with a credit card issuing bank, and wherein the step of allocating the points further comprises the first computer calculating the first portion of points and the second computer calculating the second portion of points.

\* \* \* \* \*